(12) United States Patent
Liu et al.

(10) Patent No.: US 9,166,242 B2
(45) Date of Patent: *Oct. 20, 2015

(54) MULTI-MODAL ENERGY HARVESTER

(71) Applicants: Wayne Po-Wen Liu, San Diego, CA (US); David Bartholomew Chadwick, San Diego, CA (US); Jeffrey Asher Kagan, San Diego, CA (US)

(72) Inventors: Wayne Po-Wen Liu, San Diego, CA (US); David Bartholomew Chadwick, San Diego, CA (US); Jeffrey Asher Kagan, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/965,504

(22) Filed: Aug. 13, 2013

(65) Prior Publication Data

US 2015/0249257 A1 Sep. 3, 2015

(51) Int. Cl.
| | |
|---|---|
| *H01M 8/16* | (2006.01) |
| *F03B 13/10* | (2006.01) |
| *F03B 13/12* | (2006.01) |
| *H01M 6/34* | (2006.01) |

(52) U.S. Cl.
CPC .............. *H01M 8/16* (2013.01); *F03B 13/10* (2013.01); *F03B 13/12* (2013.01); *H01M 6/34* (2013.01)

(58) Field of Classification Search
CPC ........... H01M 8/16; H01M 6/34; F03B 13/10; F03B 13/12

USPC ......................................................... 429/401
See application file for complete search history.

(56) References Cited

U.S. PATENT DOCUMENTS

| | | | |
|---|---|---|---|
| 6,913,854 B1 | 7/2005 | Alberte et al. | |
| 7,557,456 B2 | 7/2009 | Kornbluh et al. | |
| 7,632,041 B2 | 12/2009 | Jean et al. | |
| 8,012,616 B2 | 9/2011 | Tender et al. | |
| 8,104,278 B2 | 1/2012 | Browne et al. | |
| 8,148,019 B2 | 4/2012 | Tender et al. | |
| 8,344,526 B2 | 1/2013 | Bhat et al. | |
| 8,421,259 B2 | 4/2013 | Ardoise et al. | |
| 2003/0117044 A1* | 6/2003 | Urano et al. | 310/367 |
| 2007/0200457 A1* | 8/2007 | Heim et al. | 310/324 |
| 2012/0288898 A1* | 11/2012 | Lovley et al. | 435/92 |

OTHER PUBLICATIONS

SRI International; Novel Wave-Powered Generators Deployed in Sea Trials off Florida Coast; accessed from website at http://www.sri.com/research-development/actuation-power-generation; accessed on Jun. 11, 2013.

M. E. Nielsen, C. E. Reimers, H. A. Stecher III; "Enhanced Power from Chambered Benthic Microbial Fuel Cells," Environ. Sci. Technol. 41, 7895-7900, 2007.

Wayne P. Liu, Jeff Kagan, Lewis Hsu, Bart Chadwick;Pumping Microbial Fuel Cells; IEEE Explore, Oceans, 2012, pp. 1-5; Oct. 14-19, 2012.

(Continued)

*Primary Examiner* — Jonathan Jelsma (74) *Attorney, Agent, or Firm* — SPAWAR Systems Center Pacific; Kyle Eppele; J. Eric Anderson (57) ABSTRACT

An energy harvester comprising: a microbial fuel cell comprising an anode; and a pump comprising a flexible diaphragm that is configured to be flexed by an ambient, renewable energy source such that with each flexing of the diaphragm nutrient-rich media is pumped past the anode.

9 Claims, 9 Drawing Sheets

(56) References Cited

OTHER PUBLICATIONS

Guzman, Cookea, Gaya, Radachowskya, Girguishi, and Chiua; Benthic Microbial Fuel Cells: Long-Term Power Sources for Wireless Marine Sensor Networks; Proceedings: SPIE Defense, Security, and Sensing; May 2010.

D. A. Wang, H. H. Ko; Piezoelectric energy harvesting from flow-induced vibration; Journal of Micromechanics and Microengineering, Jan. 2010.

Xiaotong Gao; Vibration and Flow Energy Harvesting using Piezoelectric; Doctoral Thesis, Drexel University; Mar. 2011.

Ghangrekar and Shinde; Performance of Membrane-less Microbial Fuel Cell Treating Wastewater and Effect of Electrode Distance and Area on Electricity Production; Elsevier 2006.

* cited by examiner

MULTI-MODAL ENERGY HARVESTER

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; sscpac_t2@navy.mil. Reference Navy Case Number 101518.

BACKGROUND OF THE INVENTION

Microbial fuel cell (MFC) power outputs are typically limited by diffusion-driven transport of anode reactants. Some sources have reported order of magnitude power increases when sediment pore water is pumped about the anode to achieve a much higher flux of nutrients. (see for example U.S. Pat. No. 8,148,019 to Tender et al.) Though the benefits of active pore water transport for MFCs have been explored, there have been no practical means to operate these pumps without requiring more power than that produced by the MFCs.

SUMMARY

Disclosed herein is an energy harvester comprising a microbial fuel cell (MFC) and a pump. The MFC comprises an anode. The pump comprises a flexible diaphragm that is configured to be flexed by an ambient, renewable energy source such that with each flexing of the diaphragm nutrient-rich media is pumped past the anode.

Another embodiment of the energy harvester is disclosed herein which comprises an MFC and pump. In this embodiment, the MFC also comprises an anode and the pump comprises a flexible, electroactive polymer (EAP) element. The EAP element is configured to be flexed by an ambient, renewable, mechanical energy source such that with each flexing of the EAP element energy is produced and nutrient-rich media is pumped past the anode.

The energy harvester disclosed herein may be used for harvesting energy according to the following method steps. The first step provides for positioning an anode of a microbial fuel cell in an anaerobic anode chamber. The second step provides for hydraulically coupling the anode chamber to a diaphragm pump. The diaphragm pump comprises a diaphragm to which an electroactive polymer element is operatively coupled. The third step provides for using an ambient, renewable energy source to flex the diaphragm such that the EAP element generates electricity while oxygen-reduced, nutrient-rich media is pumped through the anode chamber. The fourth step provides for harvesting electrical energy from the microbial fuel cell and the EAP element.

BRIEF DESCRIPTION OF THE DRAWINGS

Throughout the several views, like elements are referenced using like references. The elements in the figures are not drawn to scale and some dimensions are exaggerated for clarity.

FIG. 6B is a side-view illustration of an embodiment of an energy harvester.

DETAILED DESCRIPTION OF EMBODIMENTS

Figure 1:
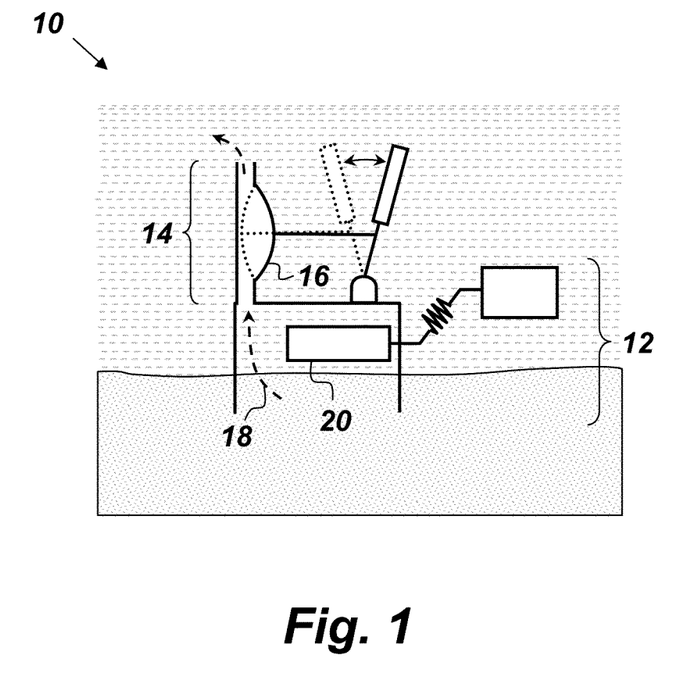
FIG. 1 is a side-view illustration of an embodiment of an energy harvester.

FIG. 1 is a side-view illustration of an energy harvester 10, which comprises, consists of, or consists essentially of a microbial fuel cell (MFC) 12 and a pump 14. The pump 14 comprises a flexible diaphragm 16 that is configured to be flexed by an ambient, renewable energy source such that as the diaphragm 16 flexes nutrient-rich media 18 is pumped past an anode 20 of the MFC 12. Suitable examples of the renewable energy source include, but are not limited to, fluctuating ambient pressure, fluid-flow-induced vibrations, wind power, wave power, and energy from a water-current turbine. The MFC 12 may be any system that harvests electricity generated by bacteria from organic matter. The energy harvester 10 may be used in any aqueous, microbial environment where bacteria and organic matter are present. Suitable examples of aqueous, microbial environments include, but are not limited to, marine environments, bodies of fresh water, and waste-water treatment environments. The nutrient-rich media 18 may be any microbial fuel source (solid, liquid, or gas) that comprises, consists of, or consists essentially of organic matter. The nutrient-rich media 18 may optionally be kept under anaerobic conditions such that it has reduced oxygen content when compared to an ambient environment. Suitable examples of nutrient-rich media 18 include, but are not limited to, benthic sediment pore water, waste-water, and fresh water that comprises organic matter. The nutrient-rich media 18 may optionally be stored in an organic matter reservoir.

Figure 2:
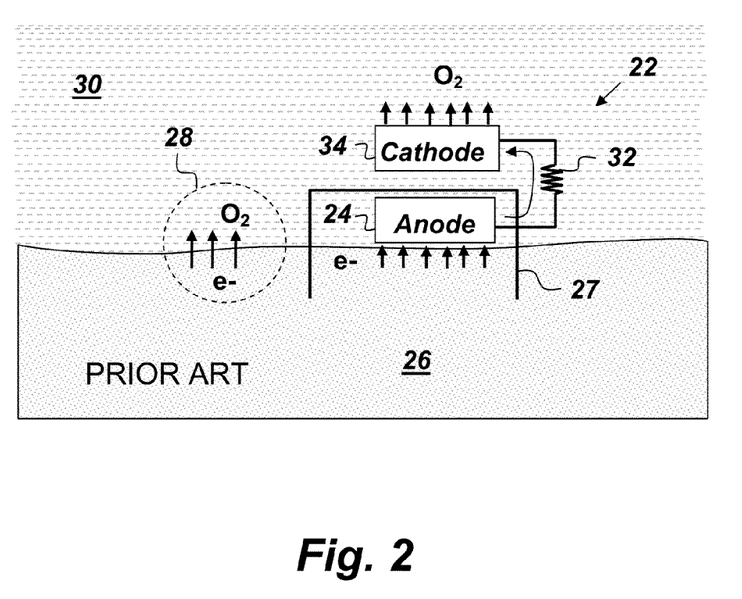
FIG. 2 is side-view of a prior art microbial fuel cell.

FIG. 2 is a depiction of a prior-art, marine-environment, MFC 22 that may be used with the energy harvester 10. MFC 22 uses an anode structure 24 that may be buried in sea-bed sediment 26 or chambered in an oxygen-impermeable chamber 27 (such as is depicted in FIG. 2). The anode structure 24 captures free electrons generated when anaerobic or facultative anaerobic bacteria metabolize sediment-based nutrients. Anode 24 resides in an anaerobic (oxygen-free) medium (e.g., the sea-bed sediment 26, and/or the water inside the chamber 27). The free electrons (e−) of the metabolized sediment require a terminal electron acceptor shown generally within circle 28, such as dissolved oxygen ($O_2$) present in seawater 30, to facilitate the microbial fuel cell process. Anode structure 24 is inserted in place of naturally occurring electron acceptors and is used to harvest the flow of electrons. The captured electrons are then passed through an electrical load 32 en route to a cathode structure 34 for release to sources of dissolved oxygen in the seawater 30. The seawater 30 and marine sediment 26 make up a microbial environment suitable for microbial fuel cell operation.

Referring again to FIG. 1, the anode 20 may be sized, shaped, formed, and/or positioned to provide exposure to the nutrient-rich media 18. The anode 20 may be constructed of any material capable of receiving electrons from the surrounding media. Suitable examples of anode material include, but are not limited to, carbon cloth, graphite chips/plates, graphite rods, graphite adhesives or coatings, graphite or carbon brush, activated carbon granules, and platinum materials. The MFC 12 may thus take many forms of construct and may also make use of special additives or coatings (mediators) that facilitate electron transfer between anode and microbes or additives that promote or accelerate microbial growth.

The energy harvester 10 may optionally comprise a flexible, electroactive polymer (EAP) element 35. The EAP element 35 is configured to be flexed by the ambient, renewable energy source such that with each flexing of the EAP element 35, energy is produced. The EAP element 35 may be any electroactive-polymer-based energy conversion device that may be used to convert electrical energy to mechanical energy and vice versa. The EAP element 35 may be attached to and/or integrated into the diaphragm 16. The diaphragm 16 may be made of a separate flexible material from the EAP element 35 or the diaphragm may be composed entirety or partially of the EAP element 35. In one embodiment, the electricity produced by the MFC 12 may be used to flex the EAP element 35 that is connected to/integrated into the diaphragm 16 such that the nutrient-rich media 18 is pumped past the anode 20 of the MFC 12. In another embodiment, an ambient, renewable energy source, other than the MFC 12 physically flexes the EAP element 35 and the electricity produced by the flexing EAP element 35 is harvested along with the electricity from the MFC 12.

Figure 3A:
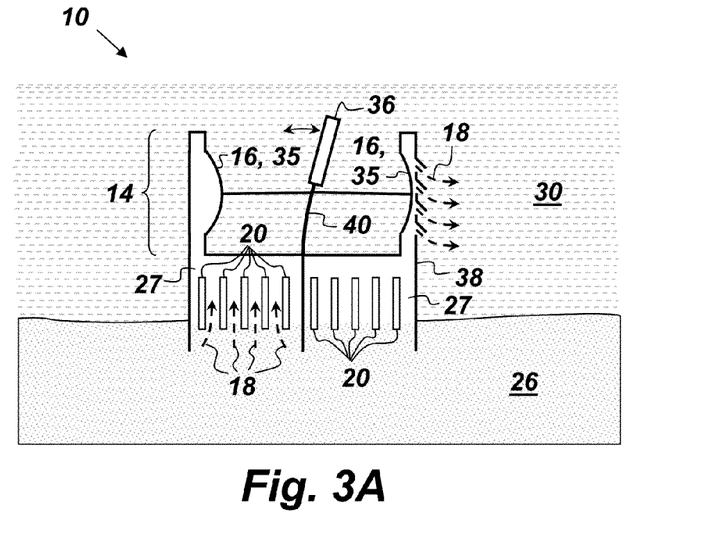
FIGS. 3A and 3B are side-view illustrations of an embodiment of an energy harvester.
Figure 3B:
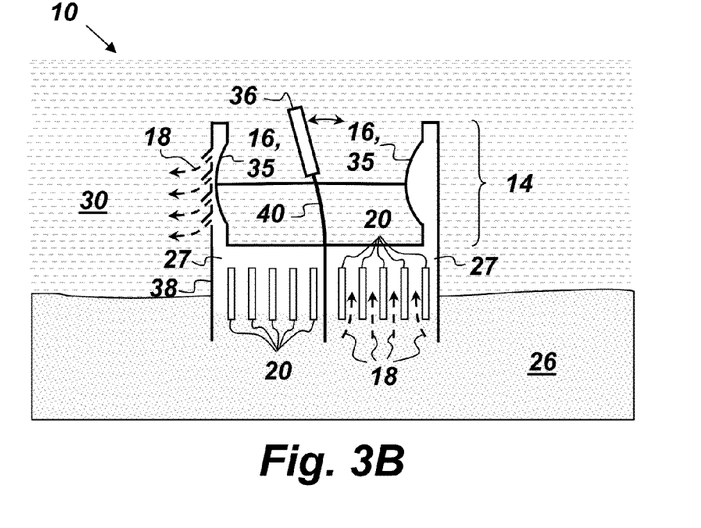

FIGS. 3A and 3B are side view illustrations of a marine embodiment of the energy harvester 10 wherein the pump 14 is a membrane pump driven by seawater-flow-induced vibrations of a bluff body 36. The EAP element 35, in this embodiment is either attached to or incorporated into the membrane of the pump 14. The entire membrane or a portion thereof may be made of the EAP element 35. It is to be understood that the pump 14 may be any device comprising the EAP element 35 and capable of pumping the nutrient-rich media 18 past the anode 20. In the embodiment of the pump 14 shown in FIGS. 3A and 3B, the bluff body 36 is connected to a frame 38 via a connecting member 40 and the frame 38 comprises dual anode chambers 27. The bluff body 36 may be any size and/or shape that cause the bluff body 36 to vibrate when exposed to fluid flow.

The Strouhal relation (i.e., 0.20=((oscillation frequency)*(cylinder diameter))/(fluid flow velocity)) may be used to design cylindrical embodiments of the bluff body 36. For example, the bluff body 36 may be a cylinder 125 millimeters (mm) long with a diameter of 20 mm. According to the Strouhal relation, the bluff body 36 will be excited to oscillate at a frequency of 1 Hertz when exposed to a fluid flow rate of 0.1 meters/second (m/s). Referring to the embodiment of the energy harvester 10 shown in FIGS. 3A and 3B, the flow of seawater 30, either into or out of the page, will cause the bluff body 36 to oscillate from side to side.

As the bluff body 36 moves to the right as shown in FIG. 3A, the EAP element 35 on the left is stretched and the EAP element 35 on the right is compressed. The stretching of the left EAP element 35 causes nutrient-rich media 18 (e.g., sediment pore water) to be pulled out of pores in the sediment 26 and into the left chamber 27. The contraction of the right EAP element 35 causes the nutrient-rich media 18 to be pumped out of the right chamber 27 into the seawater 30.

Check valves may be employed to prevent the oxygen-rich seawater 30 from entering the anode chambers 27. As the bluff body 36 moves to the left as shown in FIG. 3B, the EAP element 35 on the left is compressed and the EAP element 35 on the right is stretched. The stretching of the right EAP element 35 causes nutrient-rich media 18 (e.g., sediment pore water) to be pulled out of pores in the sediment 26 and into the right chamber 27. The contraction of the left EAP element 35 causes the nutrient-rich media 18 to be pumped out of the left chamber 27. The flow of nutrient-rich media 18 past anodes 20 increases the electrical output of the MFC 12. At the same time, the flexing of the EAP elements 16 produces additional electricity.

Figure 4:
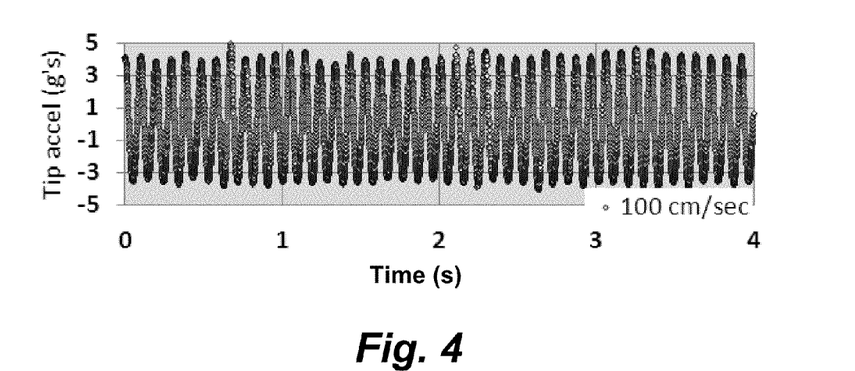
FIG. 4 is a plot of bluff-body-tip acceleration over time in the presence of a current flow.

FIG. 4 is a data plot showing tip acceleration in g's of a 13 mm diameter bluff body 36 over time as the bluff body 36 is exposed to a fluid flow of 100 centimeters per second (cm/s). From FIG. 4, it can be seen that the bluff body 36 oscillates at a substantially consistent rate of 10-11 Hz over the 4-second period. Likewise, at 10 cm/s, the bluff body 36 will demonstrate substantially consistent oscillations at 1 Hz, which is sufficient to pump fluid past the anode 20 and/or through the anode chamber 27.

The connecting member 40 may be any device that operatively couples the bluff body 36 to the frame 38 in such a way that the bluff body 36 is capable of vibrating in the presence of fluid flow. For example, the connecting member 40 may be a flexible member secured to both the frame 38 and the bluff body 36 such that the pump 14 comprises no rotary components. In another embodiment, the connecting member 40 may be a rigid member pivotally connected to the frame 38. In addition to, or in lieu of, the EAP element 35 being incorporated into the diaphragm 16 (such as is shown in FIGS. 3A and 3B) the connecting member 40 may be an EAP element 35.

Figure 5A:
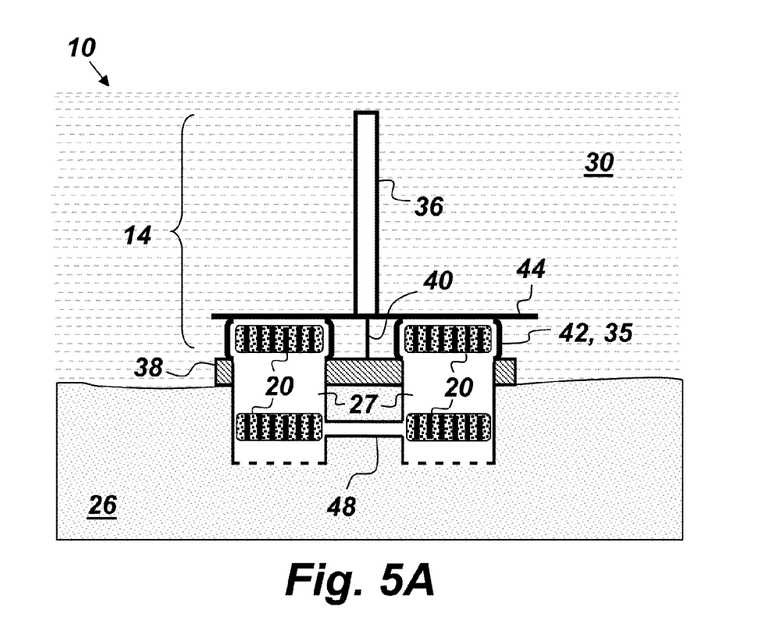
FIG. 5A is a side-view illustration of an embodiment of an energy harvester.
Figure 5B:
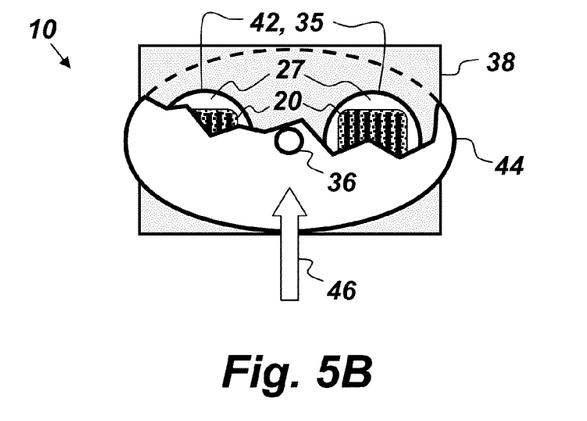
FIG. 5B is a top-view, partially-cut-away illustration of an embodiment of an energy harvester.
Figure 6A:
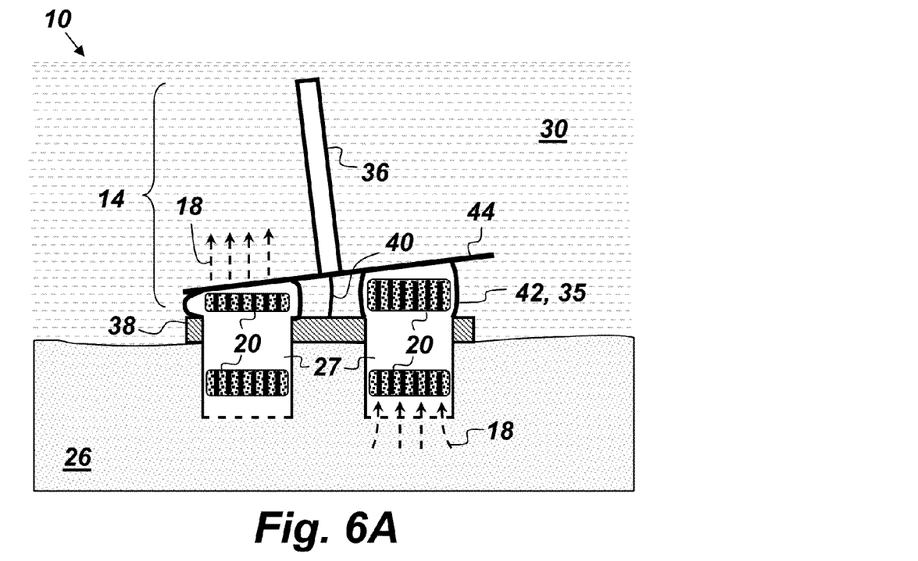
FIGS. 6A and 6B are side-view illustrations of an embodiment of an energy harvester.
Figure 6B:
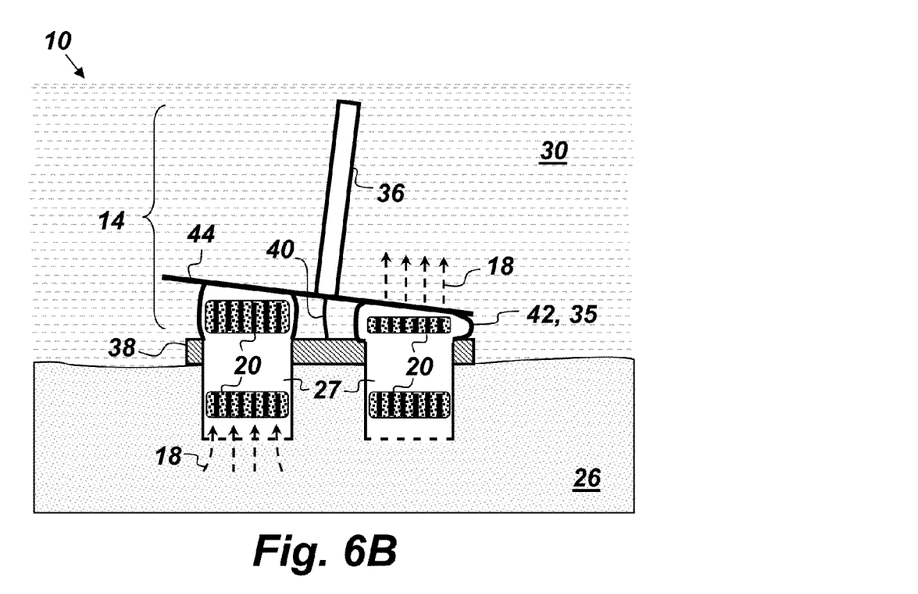

FIGS. 5A, 5B, 6A, and 6B are side, top, side, and side views respectively of another embodiment of the energy harvester 10. In this embodiment, the pump 14 is a bellows-type pump and the EAP element 35 is incorporated into the bellows 42. The EAP element 35/bellows 42 is configured such that it may be compressed and expanded by a wobble plate 44 that is connected to the bluff body 36. The wobble plate 44 is connected to the frame 38 by the connecting member 40. As seawater 30 flows past the bluff body 36, represented by arrow 46 in FIG. 5B, the wobble plate 44 draws nutrient-rich media 18 out of the sediment 26 and pumps it past the anodes 20 in the chambers 27. As shown, in FIG. 5A, the anode 20 may be placed in the chamber 27 and/or inside the bellows 42. Further the anode 20 may be positioned in the chamber 27 below the sediment 26 or above the sediment 26. The energy harvester 10 may comprise any desired number of anodes 20. FIG. 5A also shows an optional connecting channel 48 for connecting separate anode chambers 27 to allow nutrient-rich media 18 to be shared between chambers. In this embodiment, the bluff body 36 may be a cylinder 15.24 cm (6 inches) long and 20 mm in diameter. Such dimensions would result in 1 Hz excitation of the bellows pump 14 when exposed to 100 mm/s fluid flow. The energy harvester 10 may have any desired number of MFCs 12. For example, the wobble plate 44 may be configured to pump four or more anode chambers 27 such that the pump 14 operates no matter the direction of the fluid flow. In addition to, or in lieu of, the EAP element 35 being incorporated into the bellows 42 (such as is shown in FIGS. 5A, 5B, 6A, and 6B) the connecting member 40 may be an EAP element 35.

Figure 7:
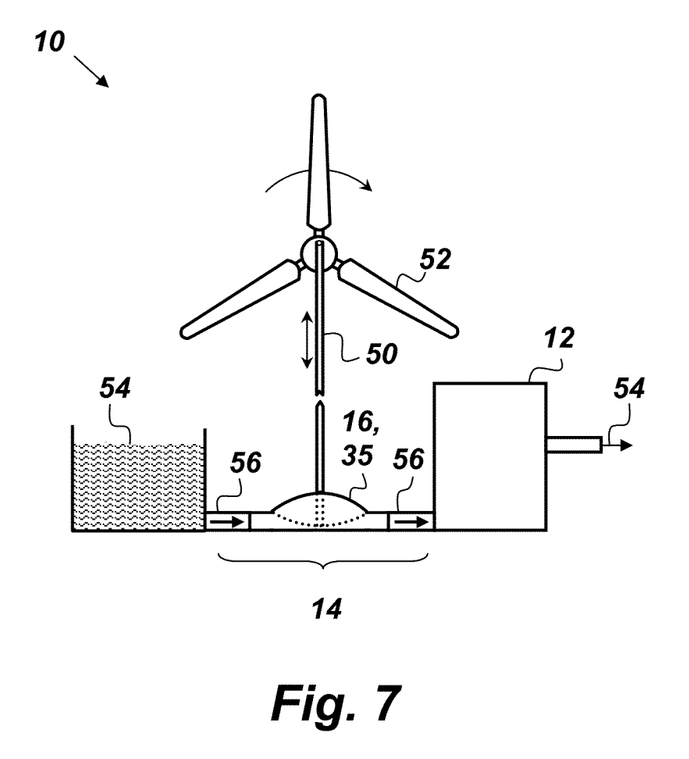
FIG. 7 is a side-view illustration of an embodiment of an energy harvester.

FIG. 7 is a side view illustration of another embodiment of the energy harvester 10. In this embodiment, the energy harvester 10 is configured to operate in a wastewater environment. In the embodiment of the energy harvester 10 shown in FIG. 7, the EAP element 35 is incorporated into the diaphragm 16 that is configured to be flexed in and out due to reciprocating motion of a shaft 50 that is operatively coupled to a wind turbine 52. The flexing of the EAP element 35 causes wastewater 54 to be pumped through the MFC 12. Wastewater 54 is prevented from flowing backwards through the pump 14 by check valves 56. The energy harvester 10 may be configured to operate above or below a water surface.

Figure 8A:
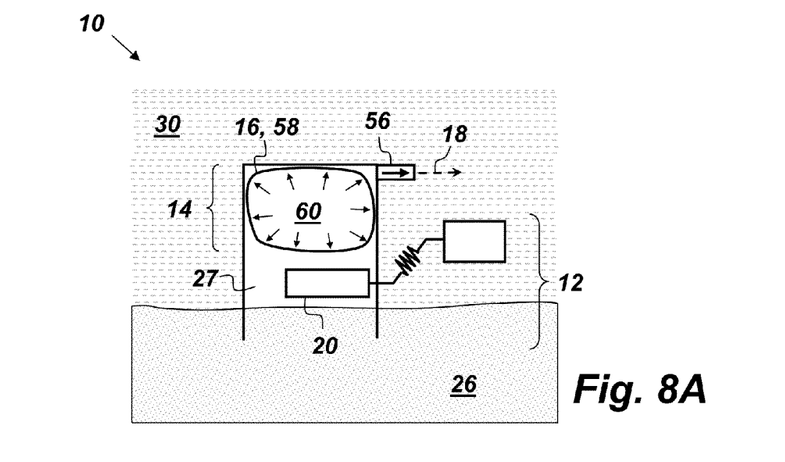
FIGS. 8A and 8B are side-view illustrations of an embodiment of an energy harvester.
Figure 8B:
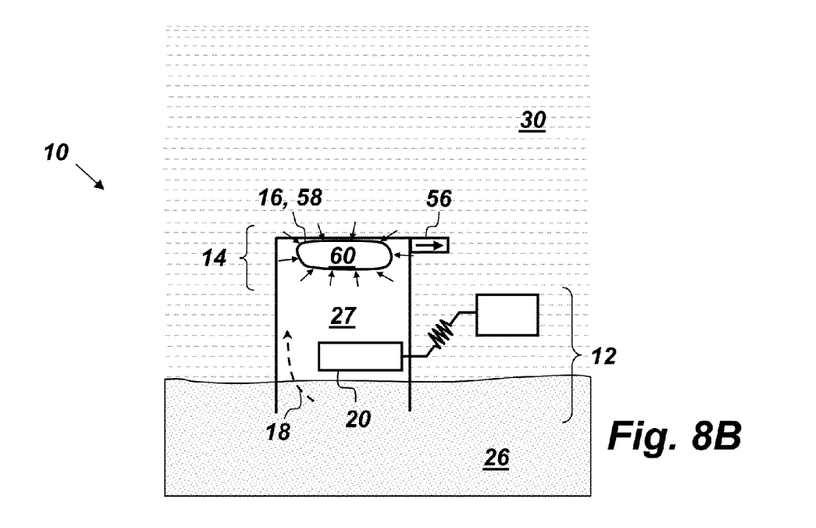

FIGS. 8A and 8B are side view illustrations of another embodiment of the energy harvester 10 showing how the pump 14 may be powered by pressure changes in a surrounding fluid (e.g., seawater 30). If the energy harvester 10 is located in a region of an ocean that is subject to water-column-height changes the resulting hydrostatic pressure differences can be used to expand and contract the diaphragm 16. In the energy harvester 10 embodiment depicted in FIGS. 8A and 8B, the diaphragm 16 is a balloon 58 that is filled with a gas 60. The balloon 58 is placed inside the anode chamber 27, which may be configured to rest on the sediment 26. The sediment-resting anode chamber 27 opened only to the sediment 26 experiences the same hydrostatic pressure as the ambient seawater 30 just outside the chamber 27. This is due to the pore water in the sediment 26 which hydrostatically connects the fluid in the chamber 27 to the ambient environment. Hydrostatic pressure changes induced by tides can be combined with one-way valves, such as the check valve 56, to compress or expand the gas-filled balloon 58 in the chamber 27—resulting in net transport of nutrient-rich media 18 into and out of the chamber 27.

FIGS. 8A and 8B respectively show the energy harvester 10 in relatively low and high pressure marine environments such as may be caused by low and high tides. In the relatively low-pressure environment (as shown in FIG. 8A), the gas 60 inside the balloon 58 expands forcing the nutrient-rich media 18 that is inside the chamber 27 to exit out the check valve 56. The check valve 56 may be located in any desired position on the chamber 27. Further, any desired number of check valves 56 may be used with the energy harvester 10 to control the transport of nutrient-rich media 18 into and out of the chamber 27. For example, a check valve 56 may optionally be placed between the anode chamber 27 and the sediment 26 such that nutrient-rich media can only flow from the sediment 26 into the chamber 27 and not vice versa. In addition, volume and flow rate controllers may be used to control the amount and flow rate of nutrient-rich media 18 that enters and exits the anode chamber 27. In the relatively high-pressure environment (as shown in FIG. 8B), the gas 60 inside the balloon 58 is compressed and nutrient-rich media 18 is drawn into the chamber 27 from the seafloor sediment 26. The pumping of the nutrient-rich media 18 past the anode 20 increases the electrical output of the MFC 12. Further, the EAP element 35 may be incorporated into the balloon 58 such that the expansion and contraction of the balloon 58 flexes the EAP element 35, which also generates electrical energy in addition to the electrical energy produced by the MFC 12.

Figure 9:
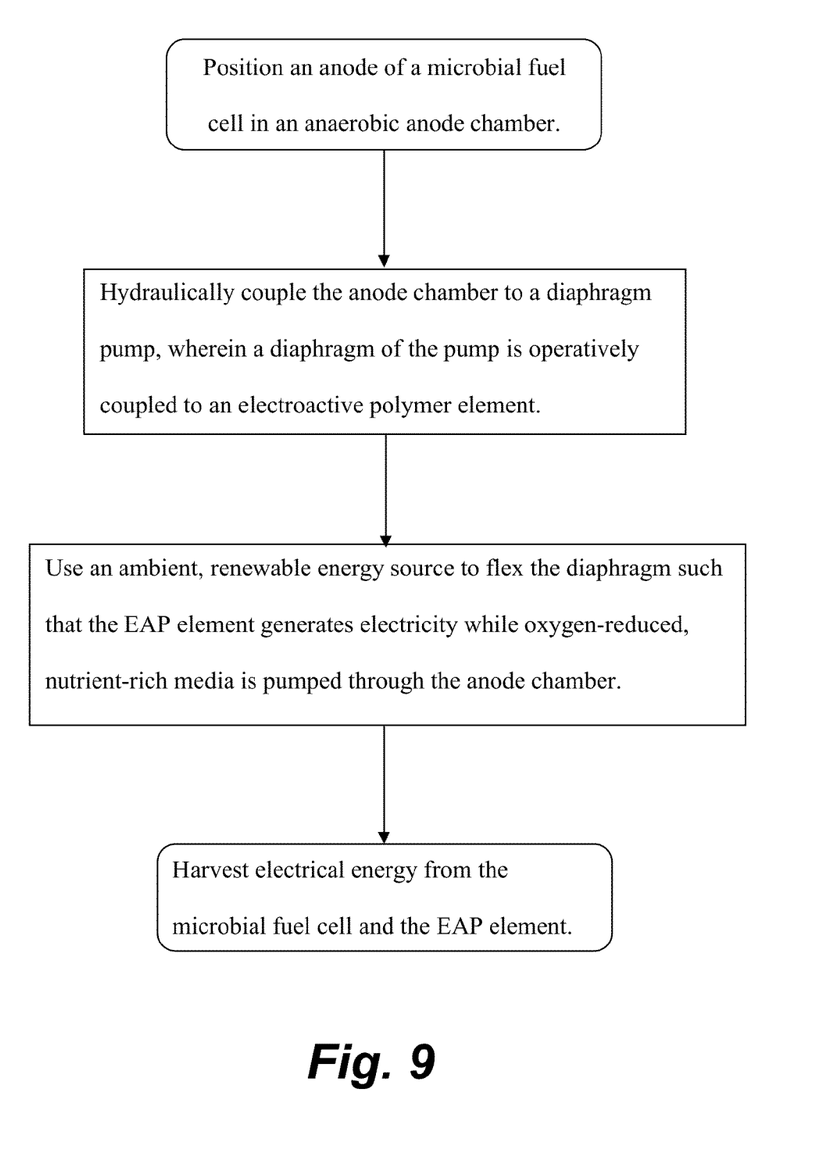
FIG. 9 is a flow chart of a method for harvesting energy.

FIG. 9 is a flowchart displaying the steps of a method for harvesting energy. The first step provides for positioning the anode 20 of the MFC 12 in the anode chamber 27. The anode chamber 27 may be anaerobic. The second step provides for hydraulically coupling the anode chamber 27 to the diaphragm pump that is operatively coupled to the EAP element 35. The third step provides for using an ambient, renewable energy source to flex the diaphragm such that the EAP element 35 generates electricity while oxygen-reduced, nutrient-rich media 18 is pumped through the anode chamber 27. The fourth step provides for harvesting electrical energy from the MFC 12 and the EAP element 35.

From the above description of the energy harvester 10, it is manifest that various techniques may be used for implementing the concepts of the energy harvester 10 without departing from its scope. The described embodiments are to be considered in all respects as illustrative and not restrictive. It should also be understood that the energy harvester 10 is not limited to the particular embodiments described herein, but is capable of many embodiments without departing from the scope of the claims.

We claim:

1. An energy harvester comprising:
   a microbial fuel cell comprising an anode and an anode chamber having a check valve, wherein the anode chamber is configured to house the anode such that the anode is exposed to oxygen-reduced, nutrient-rich media and shielded from surrounding oxygen-rich media; and
   a pump comprising a flexible diaphragm that is configured to be flexed by fluctuating hydrostatic pressure induced by tides such that with each flexing of the diaphragm nutrient-rich media is pumped past the anode, wherein the diaphragm is a gas-filled balloon that is housed in the anode chamber such that as the hydrostatic pressure decreases the balloon expands thereby forcing nutrient-rich media out the check valve, and as the hydrostatic pressure increases the balloon compresses causing oxygen-reduced nutrient-rich media to be drawn into the anode chamber.

2. The energy harvester of claim 1, wherein the pump further comprises an electroactive polymer (EAP) element operatively coupled to the balloon such that with each expansion and contraction of the balloon the EAP element produces electrical energy and nutrient-rich media is pumped past the anode.

3. The energy harvester of claim 1, wherein the pump contains no rotary components.

4. An energy harvester comprising:
   a microbial fuel cell comprising an anode; and
   a pump comprising a frame, a flexible diaphragm, a bluff body connected to the frame and operatively coupled to the diaphragm such that when the bluff body is exposed to underwater currents the bluff body vibrates creating flow-induced vibrational energy that causes the diaphragm to alternately expand and contract such that with each flexing of the diaphragm nutrient-rich media is pumped past the anode, and an electroactive polymer (EAP) element operatively coupled to the diaphragm such that with each flexing of the diaphragm the EAP element produces electrical energy.

5. The energy harvester of claim 4, wherein the EAP element is incorporated into the diaphragm.

6. The energy harvester of claim 4, wherein the bluff body is connected to the frame via the EAP element, and wherein the EAP element is a flexible connecting member.

7. The energy harvester of claim 4, further comprising a plurality of anodes, and wherein the pump further comprises a wobble plate and a plurality of diaphragms, each diaphragm corresponding to at least one anode and wherein each diaphragm is connected to the bluff body via the wobble plate such that no matter the direction of current flow at least one diaphragm is expanded and contracted causing nutrient-rich media to be pumped past its corresponding at least one anode.

8. The energy harvester of claim 7, further comprising a plurality of EAP elements and wherein each EAP element is incorporated into a corresponding diaphragm.

9. The energy harvester of claim 7, wherein the wobble plate is connected to the frame via the EAP element, and wherein the EAP element is a flexible connecting member.

* * * * *